July 23, 1957    K. H. SCOTT    2,799,877
MEAT CLEANING MACHINE WITH BRUSH SCRAPER
Filed Feb. 14, 1955    2 Sheets-Sheet 1

Kenneth H. Scott
INVENTOR.

July 23, 1957   K. H. SCOTT   2,799,877
MEAT CLEANING MACHINE WITH BRUSH SCRAPER
Filed Feb. 14, 1955   2 Sheets-Sheet 2
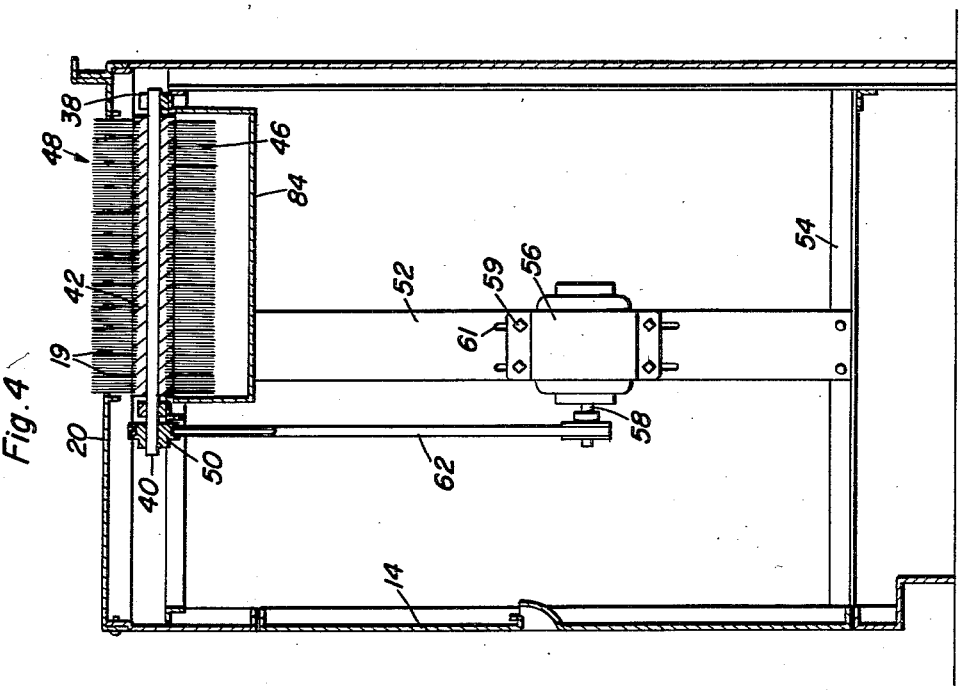
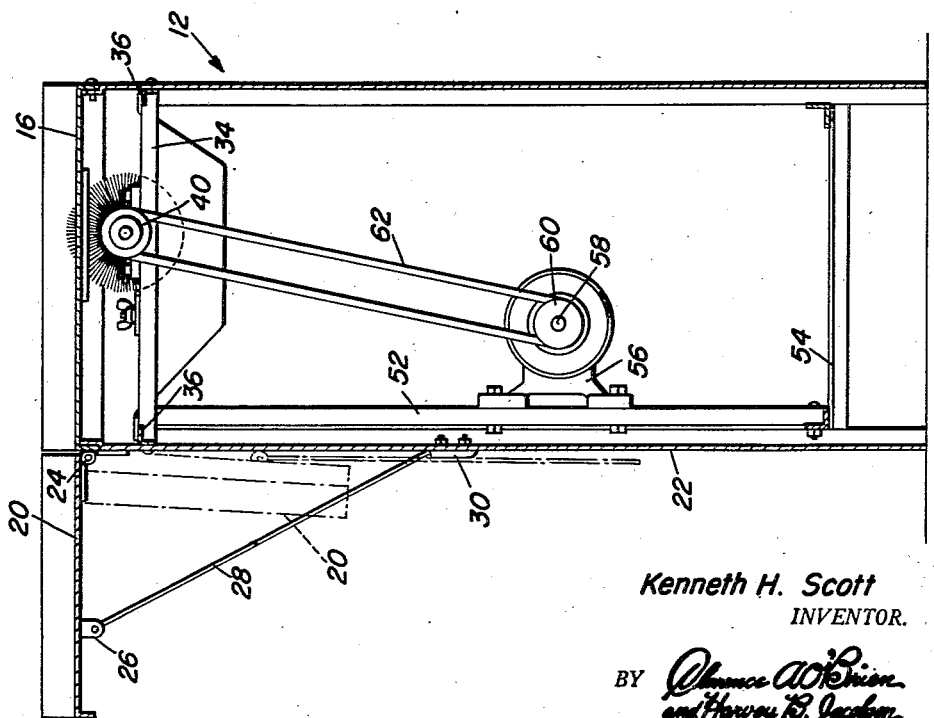
Kenneth H. Scott
INVENTOR.

United States Patent Office 2,799,877
Patented July 23, 1957

2,799,877

MEAT CLEANING MACHINE WITH BRUSH SCRAPER

Kenneth H. Scott, Oklahoma City, Okla.

Application February 14, 1955, Serial No. 487,816

3 Claims. (Cl. 15—3.1)

The present invention relates to a device for cleaning the surfaces of meat cuts and the like.

When meat is cut into its desired cuts for retail distribution by a butcher, particularly when power sawing equipment is utilized, particles of bone dust, fat and the like smear and cling to the surface of the meat thereby reducing the attractiveness of the cut for display and sale. As a consequence, it is customary at almost all markets selling any quantity of meat to remove this clinging bone dust and fat smear from the meat before displaying or packaging either by wiping the meat with rags, scraping its surface with various types of scrapers or other manual operations. The operation is slow and tedious and requires considerable time and manual exertion in its performance.

The primary object of the present invention is to provide a device which will automatically clean the surfaces of the cuts of meat completely and at the same time provide an attractive meat surface for display and packaging, which cleaning and consequent surface appearance is far superior than can be provided by hand cleaning.

Basically the invention consists in the provision of a flat top surface over which the meat may be moved which flat surface is provided with a central opening therein through which project the bristles of a rotary, power driven brush which effectively cleans and prepares the surface of the meat for display or packaging as the meat is moved over the opening.

A further object of the invention, ancillary to the primary object, is in the provision of an adjustable scraping means for the brush and the refuse collection pan carried beneath the brush into which foreign particles are scraped by the scraping means from the brush.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a transverse vertical sectional view taken substantially along the plane of section line 3—3 of Figure 1;

Figure 4 is a longitudinal, vertical sectional view taken substantially along the plane of section line 4—4 of Figure 1;

Figure 2:
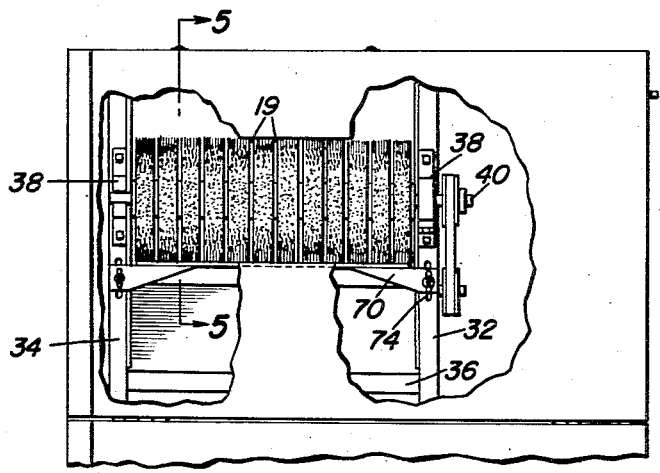
Figure 2 is a top view of the device with parts being broken away for clarity of detail.
Figure 6:
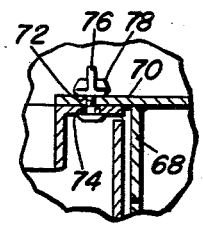
Figure 5:
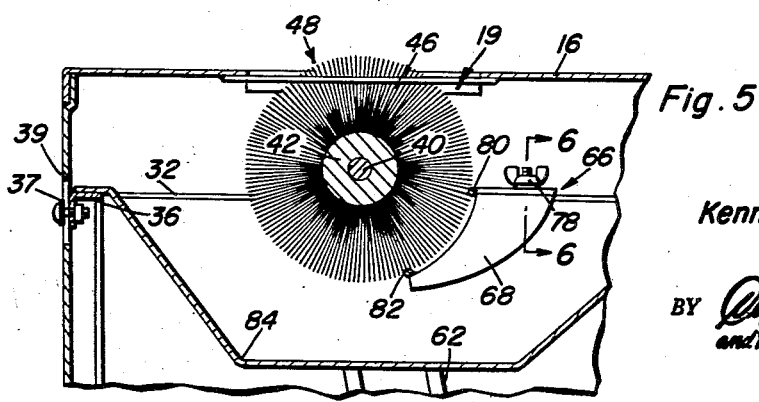

Figure 5 is a vertical, transverse sectional view through the top of the device taken substantially along the plane of section line 5—5 of Figure 2 and disclosing the mounting for a scraper assembly for the brush and its relation to the refuse collection pan; and Figure 6 is a cross sectional view taken substantially along the plane of section line 6—6 of Figure 5 of the adjustable scraper mounting for the brush.

Referring now to the drawings in detail, the meat surface cleaning machine is designated in its entirety by the numeral 10 and is seen to comprise a suitable supporting structure in the form of a substantially rectangular supporting cabinet 12 having a front opening door 14 therein and a flat top 16 thereon. The top 16 is provided centrally thereof with a longitudinal, rectangular slot or opening 18 covered with a grill work of spaced, parallel thin wire rods 19 over which the meat slides during cleaning.

In order to increase the width of the top 16, an extension 20 is provided for the top, this extension being hinged to the upper edge of the side 22 of the cabinet 12 by means of suitable hinges 24. Ears 26 depend from the undersurface of the extension 20 and a supporting brace 28 has the branched ends thereof pivotally received through suitable openings in the ears 26. The other end of the supporting brace 28 normally rests on a stop 30 provided on the side 22 of the cabinet 12. To swing the extension or wing 20 to a position generally parallel to the side 22 of the cabinet 12 it is simply necessary to remove the lower end of the supporting brace 28 from the stop 30 and allow the extension 20 to swing to its collapsed position as shown in dotted outline in Figure 3.

Within the cabinet 12 is provided a suitable supporting frame comprising front and rear supporting rails 32 and 34, respectively, and side rails 36 which form an openwork rectangular support immediately below the top 16 of the cabinet. Fastening screws 37 extending through vertical slots 39 in the side walls 12 clamp the supporting frame in vertically adjusted positions within the housing to control the extension of the cleaning brushes (described hereinafter) above the top of the cabinet.

Figure 1:
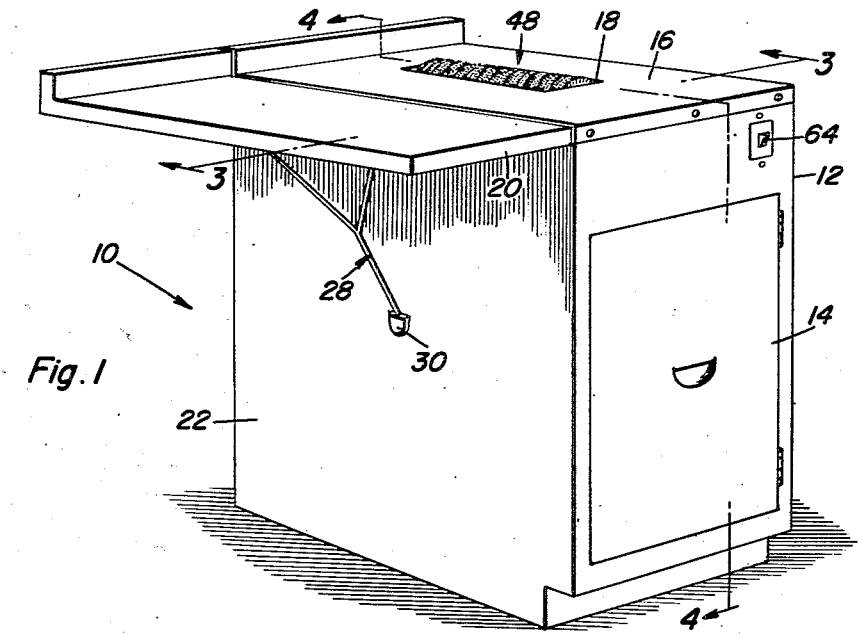
Figure 1 is a perspective view of a device made in accordance with the present invention.

Intermediate the ends of each front and rear supporting rail 32 and 34 is mounted a suitable pillow block or saddle bearing 38, the saddle bearings 38 being aligned with one another and journaling the end portions of an elongated shaft 40. Fixed to the shaft 40 and extending between the front and rear side rails 32 and 34 is a rotary brush head 42 from which project radial bristles 46 to form a rotary brush designated in its entirety by the numeral 48 as will be noted in Figure 1, a portion of the rotary brush 48 projects through the rectangular opening 18 in the top 16 of the cabinet 12.

One end of the shaft 40 is provided with a driven pulley 50.

On a vertical supporting member 52 attached at its upper end to one of the side rails 36 and at its lower end to a lower supporting rail structure 54 is mounted a suitable electric motor 56 or other prime mover having a drive shaft 58 projecting therefrom upon which is fixed a driving pulley 60. Endless belt 62 is reeved or entrained over the pulleys 50 and 58 whereby upon energization of the motor 56, the rotary brush 48 is rotated. A suitable control switch 64 for turning the motor 56 on and off is provided on the front of the cabinet 12. Fasteners 59 mount the motor in slots 61 on the supporting member 52 whereby the tension on belt 62 can be adjusted in accordance with adjustment of the brush supporting frame.

To operate the device, the means is placed on the top 16 or the top extension 20 face down and simply moved over the rectangular opening 18 whereby it is engaged by the rotary brush 48 which cleans foreign material from the surface thereof and provides an attractive display surface on the meat surface at the same time.

To scrape foreign material from the bristles of the rotary brush 48, a suitable scraping apparatus 66 is provided.

This scraping apparatus consists essentially of a pair of downwardly depending brackets one of which is disposed adjacent each of the front and rear walls 32 and 34 respectively, these brackets being designated individually by the numeral 68. The inner edge surface of each bracket 68 is curved to conform to the curvature of the rotary brush 48 and is provided in underlying relation with a portion of the brush adjacent the periphery thereof.

Each bracket 68 is provided with a suitable flange or ear 70 a portion of which overlies the adjacent or rear supporting rail 32 or 34. Each ear 70 is provided with an aperture 72 in registry with an elongated slot 74 in the associated front or rear rail. A suitable fastener 76 extends through each aligned aperture 72 and slot 74 and wing nut 78 frictionally, adjustably attaches each ear in relatively fixed position on its associated rail 32 or 34.

Extending between the scraping brackets 68 and secured at their ends to the inner edges thereof are suitable upper and lower scraping rods 80 and 82 respectively which engage the periphery of the brush 48 to scrape foreign material therefrom.

Suitably removably suspended from the side rails 36 is a refuse collection pan 84 which underlies the brush 48 and the scraper assembly 66 so that foreign material scraped from the brush 48 falls thereinto. This pan may be conveniently removed for emptying and cleaning through the access door 14 in front of the cabinet 12.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, failing within the scope of the appended claims.

What is claimed as new is as follows:

1. A machine for cleaning the surface of meats after cutting comprising a supporting structure having a generally flat top, said top having an opening therein, a rotary brush having a curved surface and journaled on said supporting structure beneath said top and having a portion of the periphery thereof projecting through said opening, means for rotating said brush whereby as meat is moved over the top opening the surface thereof will be cleaned, said supporting structure including a pair of spaced, parallel rails, bearings on said rails journaling said brush therebetween, and a brush cleaning structure extending between and adjustably secured to said rails, said brush cleaning structure comprising a pair of spaced arcuated brackets conforming to the curvature of said brush and having scraping elements extending therebetween.

2. A machine for cleaning the surface of meats after cutting comprising a supporting structure having a generally flat top, said top having an opening therein, a rotary brush having a curved surface and journaled on said supporting structure beneath said top and having a portion of the periphery thereof projecting through said opening, means for rotating said brush whereby as meat is moved over the top opening the surface thereof will be cleaned, said supporting structure including a pair of spaced, parallel rails, bearings on said rails journaling said brush therebetween, a brush cleaning structure extending between and adjustably secured to said rails, said brush cleaning structure comprising a pair of spaced arcuated brackets conforming to the curvature of said brush and having scraping elements extending therebetween, said rails having slots therein, said brackets having ears overlying said slots, said ears having openings therein registering with said slots, and fasteners extending through said registering slots and opening for adjustably frictionally retaining said brackets on said rails.

3. A machine for cleaning the surface of meats after cutting comprising a supporting structure having a generally flat top, said top having an opening therein, a rotary brush having a curved surface and journaled on said supporting structure beneath said top and having a portion of the periphery thereof projecting through said opening, means for rotating said brush whereby as meat is moved over the top opening the surface thereof will be cleaned, said supporting structure including a pair of spaced, parallel rails, bearings on said rails journaling said brush therebetween, a brush cleaning structure extending between and adjustably secured to said rails, said brush cleaning structure comprising a pair of spaced arcuated brackets conforming to the curvature of said brush and having scraping elements extending therebetween, said rails having slots therein, said brackets having ears overlying said slots, said ears having openings therein registering with said slots, fasteners adjustably frictionally retaining said brackets on said rails and extending through said registering slots and openings, and a grill over said opening and having the bristles of said brush projecting through said grill.

References Cited in the file of this patent

UNITED STATES PATENTS

| 1,420,375 | Gales | June 20, 1922 |
| 1,480,542 | Brown | Jan. 15, 1924 |
| 1,567,693 | Allen et al. | Dec. 29, 1925 |
| 1,670,809 | Hormel | May 22, 1928 |
| 2,026,414 | Burch | Dec. 31, 1935 |
| 2,524,214 | Webster et al. | Oct. 3, 1950 |

FOREIGN PATENTS

| 157,754 | Germany | Jan. 21, 1905 |
| 583,750 | France | Jan. 20, 1925 |
| 1,057,621 | France | Oct. 28, 1953 |